United States Patent
Cseri et al.

(10) Patent No.: US 7,500,017 B2
(45) Date of Patent: Mar. 3, 2009

(54) METHOD AND SYSTEM FOR PROVIDING AN XML BINARY FORMAT

(75) Inventors: Istvan Cseri, Redmond, WA (US); Oliver Nicolas Seeliger, Sammamish, WA (US); Andrew J. Layman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 09/838,436

(22) Filed: Apr. 19, 2001

(65) Prior Publication Data

US 2003/0046317 A1    Mar. 6, 2003

(51) Int. Cl.
　　G06F 15/16　　(2006.01)
　　G06F 17/24　　(2006.01)
　　H03M 7/08　　(2006.01)
　　G06F 17/00　　(2006.01)
　　G06F 17/22　　(2006.01)
　　H03M 7/00　　(2006.01)

(52) U.S. Cl. .................. 709/246; 709/231; 715/236; 715/239; 715/242; 341/79; 341/95; 341/106

(58) Field of Classification Search .............. 709/201, 709/231, 247, 203, 219, 235, 236, 246; 341/79, 341/95, 105, 106; 715/234, 236, 239, 242
See application file for complete search history.

(56) References Cited

U.S. PATENT DOCUMENTS

| | | | | |
|---|---|---|---|---|
| 4,597,057 A | * | 6/1986 | Snow | 341/60 |
| 5,488,725 A | * | 1/1996 | Turtle et al. | 707/5 |
| 5,881,290 A | * | 3/1999 | Ansari et al. | 717/136 |
| 5,890,103 A | * | 3/1999 | Carus | 704/9 |
| 5,991,771 A | * | 11/1999 | Falls et al. | 707/202 |
| 5,999,949 A | * | 12/1999 | Crandall | 715/532 |
| 6,012,063 A | * | 1/2000 | Bodnar | 707/101 |
| 6,081,842 A | * | 6/2000 | Shachar | 709/229 |
| 6,163,811 A | * | 12/2000 | Porter | 709/247 |
| 6,205,574 B1 | * | 3/2001 | Dellinger et al. | 716/16 |
| 6,209,124 B1 | * | 3/2001 | Vermeire et al. | 717/114 |
| 6,275,301 B1 | * | 8/2001 | Bobrow et al. | 358/1.2 |
| 6,311,223 B1 | * | 10/2001 | Bodin et al. | 709/247 |
| 6,327,561 B1 | * | 12/2001 | Smith et al. | 704/9 |
| 6,345,307 B1 | * | 2/2002 | Booth | 709/247 |
| 6,356,920 B1 | * | 3/2002 | Vandersluis | 715/210 |
| 6,374,250 B2 | * | 4/2002 | Ajtai et al. | 707/101 |
| 6,393,389 B1 | * | 5/2002 | Chanod et al. | 704/7 |
| 6,405,162 B1 | * | 6/2002 | Segond et al. | 704/9 |

(Continued)

OTHER PUBLICATIONS

"TXP transaction based XML parser".*

(Continued)

*Primary Examiner*—Larry D Donaghue
*Assistant Examiner*—Melvin H Pollack
(74) *Attorney, Agent, or Firm*—Woodcock Washburn LLP

(57) ABSTRACT

A technique for incorporating binary formatting into a tag-based description language, such as XML, is provided. The binary formatting is achieved by tokenizing the tag and attribute names into variable sized numeric tokens, thereby obviating the need for repetitive or redundant storage of lengthy unicode words, etc. The binary formatting minimizes parsing time and the generation of overhead incident to the formatting and parsing of data. Parsing time is thereby substantially decreased and generally, the size of the resulting file decreases too.

19 Claims, 6 Drawing Sheets

U.S. PATENT DOCUMENTS

| | | | |
|---|---|---|---|
| 6,408,311 B1* | 6/2002 | Baisley et al. | 707/203 |
| 6,470,345 B1* | 10/2002 | Doutre et al. | 707/100 |
| 6,493,662 B1* | 12/2002 | Gillam | 704/9 |
| 6,507,846 B1* | 1/2003 | Consens | 707/100 |
| 6,513,002 B1* | 1/2003 | Gillam | 704/9 |
| 6,635,088 B1* | 10/2003 | Hind et al. | 715/513 |
| 6,654,953 B1* | 11/2003 | Beaumont et al. | 717/158 |
| 6,665,841 B1* | 12/2003 | Mahoney et al. | 715/204 |
| 6,671,853 B1* | 12/2003 | Burkett et al. | 715/235 |
| 6,763,499 B1* | 7/2004 | Friedman et al. | 715/513 |
| 6,772,139 B1* | 8/2004 | Smith, III | 707/3 |
| 6,775,298 B1* | 8/2004 | Aggarwal | 370/473 |
| 6,804,677 B2* | 10/2004 | Shadmon et al. | 707/101 |
| 6,880,125 B2 | 4/2005 | Fry | 715/513 |
| 6,886,130 B1* | 4/2005 | Unger et al. | 715/207 |
| 6,966,027 B1* | 11/2005 | Krasinski | 715/234 |
| 6,976,165 B1* | 12/2005 | Carpentier et al. | 713/165 |
| 6,981,212 B1* | 12/2005 | Claussen et al. | 715/205 |
| 7,003,719 B1* | 2/2006 | Rosenoff et al. | 715/205 |
| 7,086,002 B2* | 8/2006 | Elo et al. | 715/234 |
| 7,281,203 B2* | 10/2007 | Gessner | 715/271 |
| 2002/0029232 A1* | 3/2002 | Bobrow et al. | 707/517 |
| 2003/0005410 A1* | 1/2003 | Harless | 717/114 |
| 2003/0023628 A1* | 1/2003 | Girardot et al. | 707/513 |

OTHER PUBLICATIONS

Bray, Tim et al., editors. "Extensible Markup Language (XML) 1.0," W3C Rcommendation, Feb. 10, 1998, pp. 1-37.*

Clark, James et al. "XML Path Language (XPath) Version 1.0," W3C Proposed Recommendation, Oct. 8, 1999, pp. 1-37.*

Wireless Application Protocol Forum. Ltd. "WAP Binary XML Content Format," Specification, Version 1.2, Proposed Version, Aug. 15, 1999, pp. 1-22.*

Whitehead, E. and Murata, M. "XML Media Types," RFC 2376, Jul. 1998, pp. 1-15.*

Rose, M. "Writing I-Ds and RFCs using XML," RFC 2629, Jun. 1999, pp. 1-31.*

"TXP transaction based XML paser", pp. 1-9, 1999.*

Andrivet, S., "A Simple XML Paser," *C/C++Users Journal*, Jul. 1999, 22, 24, 26-28, 30 and 32.

Chahuneau, F., "SGML & Schemas: From SGML DTDs to XML-Data," *Conference Proceedings SGML/XML Europe '98: From Theory to New Practices*, Paris, France, May 17-21, 1998, Graphic Communications Association, 83-88.

Girardot, M. et al., "Millau: an encoding formal for efficient representation and exchange of XML over the Web," *Computer Networks*, 2000, 33, 747-765.

Girardot, M. et al., "Efficient Representation and Streaming of XML Content Over the Internet Medium," *IEEE*, 2000, 67-70.

Liefke, H. et al., "An Extensible Compressor for XML Data," *SIGMOD Record*, Mar. 2000, 29(1), 57-62.

Liefke, H. et al., "Xmill: an Efficient Compressor for XML Data," *Proceedings of the 2000 ACM SIGMOD: International Conference on Management of Data*, Dallas, Texas, Chen, W. et al. (eds.), May 16-18, 2000, 153-164.

Mamas, E. et al., "Towards Portable Source Code Representations Using XML," *IEEE*, 2000, 172-182.

* cited by examiner

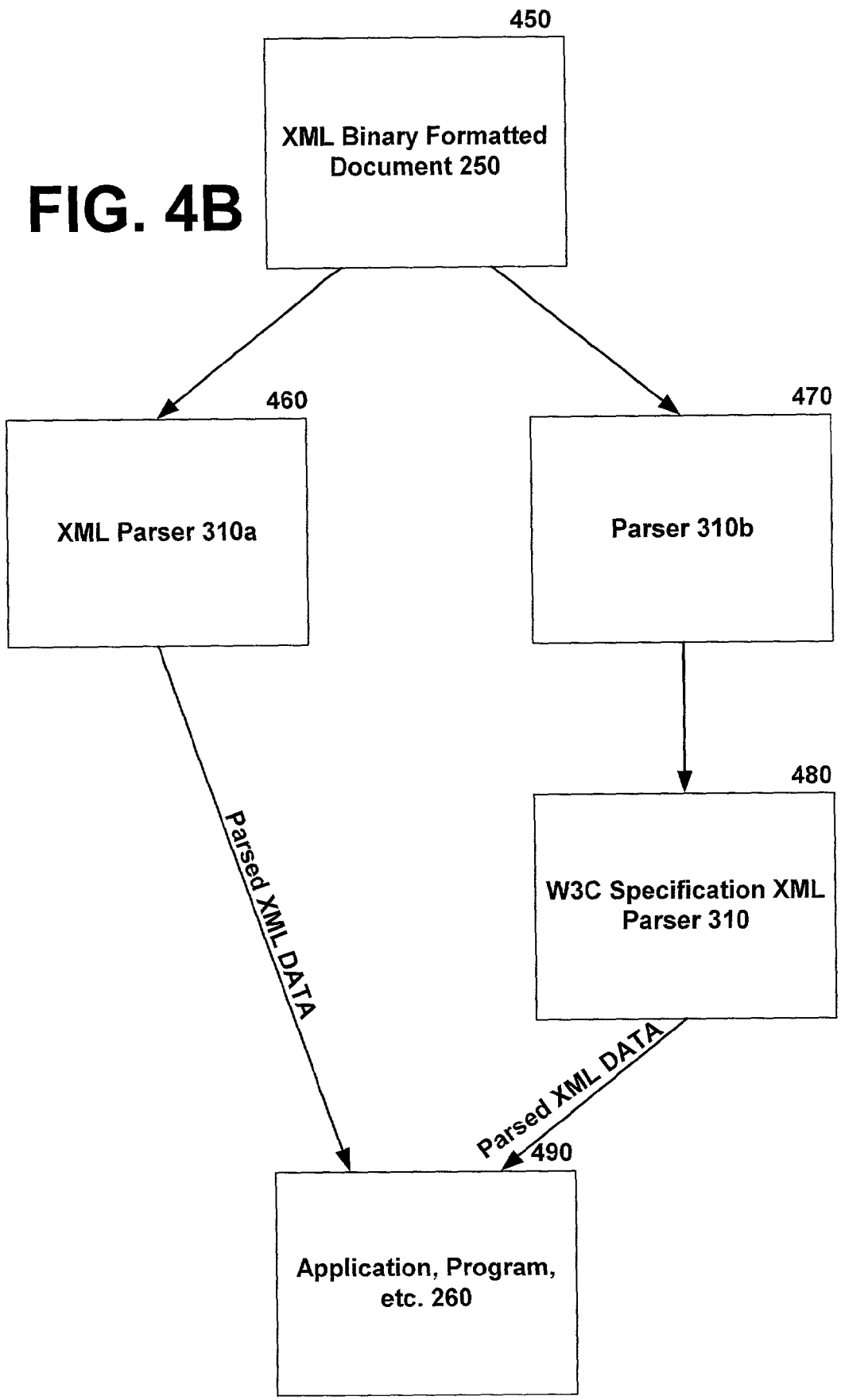

METHOD AND SYSTEM FOR PROVIDING AN XML BINARY FORMAT

FIELD OF THE INVENTION

The present invention relates to tag-based descriptions of data. More particularly, the present invention relates to binary formatting of tag-based data descriptions. The present invention is suited for, but by no means limited to, methods and systems for tokenizing text-based data formats such as XML.

BACKGROUND OF THE INVENTION

XML, the Extensible Markup Language, is a W3C-endorsed standard for document markup. It defines a generic syntax used to mark up data with simple and complex human-readable tags. It provides a self-describing standard format for computer documents. This format is flexible enough to be customized for domains as diverse as web sites, electronic data interchange, vector graphics, genealogy, real estate listings, object serialization, remote procedure calls, voice mail systems, etc.

XML is one of the most important developments in document syntax in the history of cross-platform computing. In the last few years, XML has been adopted in fields as diverse as law, aeronautics, finance, insurance, robotics, multimedia, hospitality, travel, art, construction, telecommunications, software design, agriculture, physics, journalism, theology, retail, and medieval literature. XML has become the syntax of choice for newly designed document formats across almost all computer applications. For example, XML is used on Linux, Windows, Macintosh, and many other computer platforms. Mainframes on Wall Street trade stocks with one another by exchanging XML documents. Children playing games on their home PCs save their documents in XML. Sports fans receive real-time game scores on their cell phones in XML. In short, XML is a robust, reliable, and flexible document syntax.

One prevailing problem with XML is that parsing of the XML document by the recipient computing device generates unnecessary overhead, and thus inserts time delays in the process. This is especially true when parsing certain types of data. The piece-by-piece process of dividing the document into individual elements, attributes, and other pieces, also known as "tokenization", can consume a considerable amount of time. This is particularly true where the original data is stored as text, but could be better represented as a binary number, such as might be the case for float numbers or the like. Also, as both high speed wired and wireless systems proliferate, the use of streaming data in connection therewith also has increased, and thus there is a concomitant need for an XML format that can be quickly parsed as data is received. Furthermore, some computing systems are known to output or store a particular type of data. When data in such systems is transmitted as an XML document, the pre-knowledge concerning the particular type of data is not currently exploited since the XML document is formed in exactly the same way regardless.

It would thus be advantageous to provide binary formatted XML data that effectively pre-tokenizes XML documents/data, thereby effectively reducing parsing time for a receiving application or program. It would be further advantageous to provide binary formatted XML data that effectively represents data natively formatted in binary XML. It would be desirable to reduce the overall size of an XML document as a result of an XML binary format. It would be further desirable, in connection with particular types of computing systems, to provide a tailored approach when applying binary formatting to the XML document. It would be further advantageous in the context of applications generating XML from a non-XML based data source due to the avoided cost of text transformations.

SUMMARY OF THE INVENTION

In view of the foregoing, the present invention provides a way of incorporating binary formatting into a tag-based description language, such as XML. The binary formatting is achieved by tokenizing the tag and attribute names into variable sized numeric tokens, thereby obviating the need for repetitive or redundant storage of lengthy unicode words, etc. The binary formatting minimizes parsing time and the generation of overhead incident to the formatting and parsing of data. Parsing time and where applicable XML generation time are thereby substantially decreased and generally, the size of the resulting file decreases too.

Other features of the present invention are described below.

BRIEF DESCRIPTION OF THE DRAWINGS

The system and methods for implementing binary formatting are further described with reference to the accompanying drawings in which:

FIGS. 4A and 4B are exemplary flow diagrams illustrating exemplary sequences for communications between transmitting and receiving devices of an XML binary formatted document according to the present invention.

DETAILED DESCRIPTION OF THE INVENTION

Overview

The XML binary format of the present invention minimizes the parsing and generation of overhead in connection with XML documents. The present invention provides a means for taking an arbitrary well-formed XML document in a text format, a means for converting it to a binary format, and a means for converting the document back to the text format without a loss of fidelity. The format of the present invention is also generally designed to reduce the size of an XML document assuming that the text is left in the same character encoding. This is achieved by tokenizing the XML tag names and attribute names into variable sized numeric tokens.

In order to reduce XML text generation overhead when the original data is binary, the format allows primitive types to be present in the stream in their 'native' binary representation. In order to simplify generating composite XML documents from existing data and fragments, the present invention also allows XML text embedded in the document. In this case, the character encoding matches the encoding of the main document.

Streaming access is also important both at parsing and generation time, and so the format is designed to allow incremental output and parsing of the XML document without forcing the creation of a global token table or string table at the beginning of the stream. These and other aspects are described in more detail below.

Exemplary Computer And Network Environments

As related in the background, XML, as a flexible text-based description, creates a myriad of opportunities to move data from one set of one or more locations to another set of one or more locations. Thus, any time data is formatted as an XML document, the data may be exchanged across platforms of virtually any known computing device.

A computing device or other client device can be deployed as part of a computer network. Thus, the present invention pertains to any computer system having any number of memory or storage units, and any number of applications and processes occurring across any number of storage units or volumes. The present invention may apply to an environment with server computers and client computers deployed in a network environment, having remote or local storage, wherein the network is wired and/or wireless.

Figure 1:
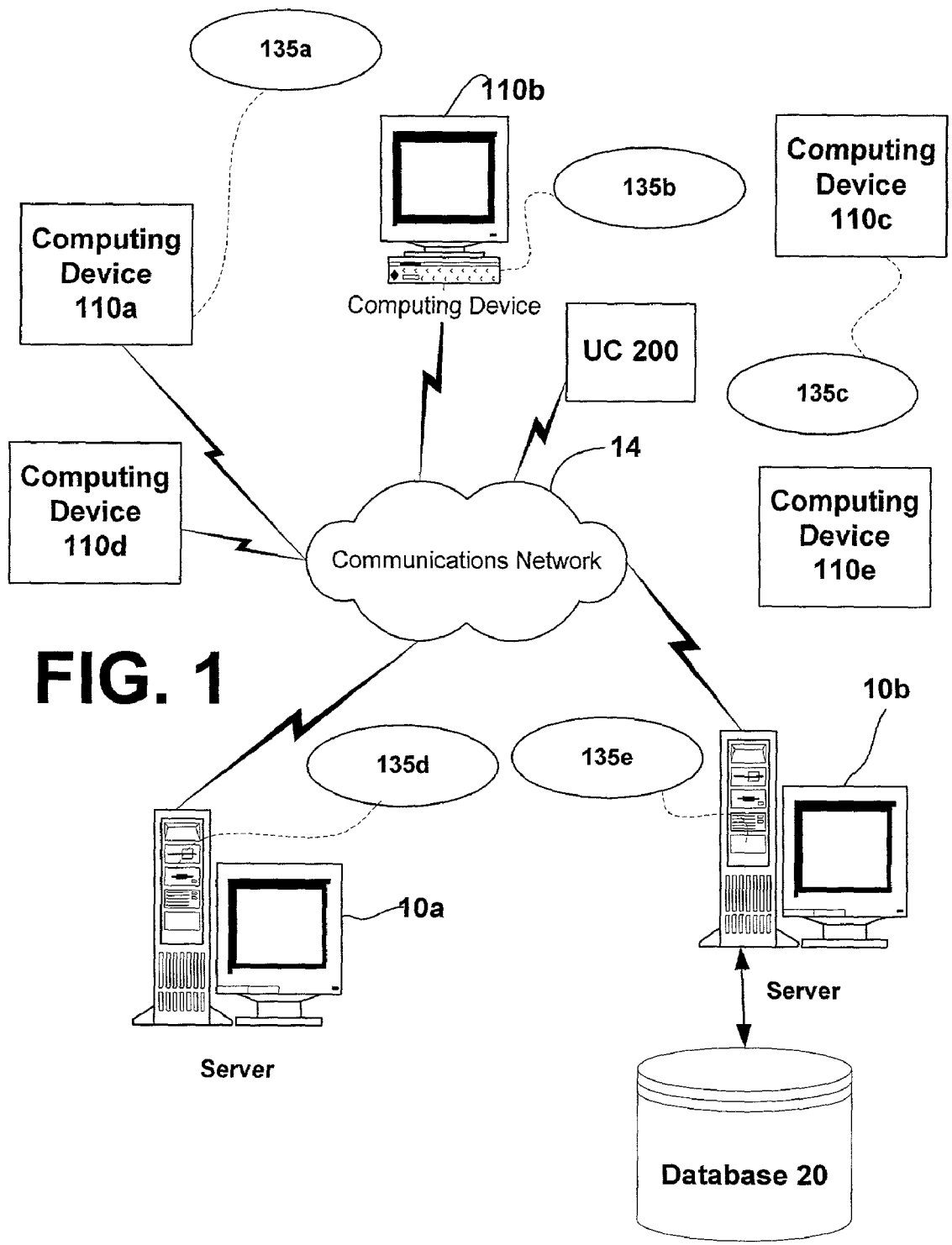
FIG. 1 is a block diagram representing an exemplary computer and network environment in which the present invention may be implemented.

FIG. 1 and the following discussion are intended to provide a brief general description of a suitable computing environment in which the invention may be implemented. Although not required, the invention will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, gaming platforms and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client or remote computing devices 110a, 110b, 110c, 110d, 110e, etc., such as a portable computer, handheld computer, thin client, networked appliance, or other device, such as a VCR, TV, heater and the like in accordance with the present invention. In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the communications therewith. Each client computer 110 and server computer 10 may be equipped with various application program modules 135 and with connections or access to various types of storage elements or objects, such as database 20, across which files may be stored or to which portion(s) of files may be downloaded or migrated. Any server 10a, 10b, etc. may be responsible for the maintenance and updating of a database 20, such as a database 20 for storing data, which may be formatted as an XML document. Thus, the present invention can be utilized in a computer network environment having client computers 110a, 110b, etc. for accessing and interacting with a computer network 14 and server computers 10a, 10b, etc. for interacting with client computers 110a, 110b, etc. and other devices and databases 20.

The computing system environment is only one example of a suitable computing environment and is not intended to suggest any limitation as to the scope of use or functionality of the invention. For example, tag-based data descriptions may be useful in a wide range of platforms. Neither should the computing environment be interpreted as having any dependency or requirement relating to any one or combination of components illustrated in other exemplary Figures.

Computing devices 110 may include a variety of computer-readable media. Computer-readable media can be any available media that can be accessed by computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, random access memory (RAM), read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computing device 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

XML Overview

XML is a meta-markup language for text documents. Data is included in XML documents as strings of text, and the data is surrounded by text markup that describes the data. A particular unit of data and markup is called an element. The XML specification defines the exact syntax this markup must follow: how elements are delimited by tags, what a tag looks like, what names are acceptable for elements, where attributes are placed, and so forth. Superficially, the markup in an XML document looks much like that in an HTML document, but some crucial differences exist.

For the most part, XML is a meta-markup language so that XML does not have a fixed set of tags and elements that are always supposed to work for everyone in all areas of interest. Attempts to create a finite set of such tags are doomed to failure. Instead, XML allows developers and writers to define the elements they need as they need them. Chemists can use tags that describe elements, atoms, bonds, reactions, and other items encountered in chemistry. Real estate agents can use elements that describe apartments, rents, commissions, locations, and other items needed in real estate. Musicians can use elements that describe quarter notes, half notes, G clefs, lyrics, and other objects common in music. The X in XML stands for Extensible. Extensible means that the language can be extended and adapted to meet many different needs.

There are also hundreds of formally established XML applications from the W3C and other standards bodies, such as OASIS and the Object Management Group. There are even more informal, unstandardized applications from individuals and corporations, such as Microsoft's Channel Definition Format and John Guajardo's Mind Reading Markup Language. Other generic supporting technologies that have been layered on top of XML and are used across a wide range of XML applications include: Xlinks, XSLT, Xpointers, Xpath, Namespaces, SAX and DOM.

Xlinks is an attribute-based syntax for hyperlinks between XML and non-XML documents that provide the simple, one-directional links familiar from HTML, multidirectional links between many documents, and links between documents to which there is no write access. XSLT is an XML application that describes transformations from one document to another, in either the same or different XML vocabularies. Xpointers is a syntax for identifying particular parts of an XML document referred to by a URI; often used in conjunction with an XLink. Xpath is a non-XML syntax used by both XPointers and XSLT for identifying particular pieces of XML documents. For example, an XPath can locate the third address element in the document, or all elements with an email attribute whose value is soandso@someplace.somedomain. Namespaces provide a means of distinguishing between elements and attributes from different XML vocabularies that have the same name; for instance, the title of a book and the title of a web page in a web page about books. SAX is the Simple API for XML, an event-based Java application programming interface implemented by many XML parsers. DOM is the Document Object Model, a tree-oriented API that treats an XML document as a set of nested objects with various properties.

All these technologies, whether defined in XML (XLinks, XSLT, and Namespaces) or in another syntax (XPointers, XPath, SAX, and DOM), are used in many different XML applications.

Some XML applications are relevant to only some users of XML, including: SVG, MathML, CML, RDF and CDF. SVG is short for Scalable Vector Graphics, which is a W3C-endorsed standard used for encoding line drawings in XML. MathML (the Mathematical Markup Language) is a W3C-endorsed standard XML application used for embedding equations in web pages and other documents. CML (the Chemical Markup Language) was one of the first XML applications. It describes chemistry, solid-state physics, molecular biology, and the other molecular sciences. RDF (the Resource Description Framework) is a W3C-standard XML application used for describing resources, with a particular focus on the sort of metadata one might find in a library card catalog. CDF (the Channel Definition Framework) is a nonstandard, Microsoft-defined XML application used to publish web sites to Internet Explorer for offline browsing.

These applications (and hundreds more like them) are intended primarily for use with special software that knows their format intimately. For instance, graphic designers do not work directly with SVG. Instead, they use their customary tools, such as Adobe Illustrator, to create SVG documents. They may not even know they're using XML. Thus, XML technologies span a wide range of XML applications, not those that are relevant only within a few restricted domains.

With knowledge of the format, developers can write programs that interact with, massage, and manipulate data in XML documents. Off-the-shelf software like web browsers and text editors can be used to work with XML documents. Some tools are able to work with any XML document. Others are customized to support a particular XML application in a particular domain like vector graphics and may not be of much use outside that domain. But in all cases, the same underlying syntax is used even if the syntax is hidden by more user-friendly tools or restricted to a single application. One unexpected but advantageous development in XML was its enthusiastic adoption of 'data-heavy' structured documents such as spreadsheets, financial statistics, mathematical tables, and software file formats.

Although XML is flexible in the elements it allows to be defined, it is strict in many other respects. It provides a grammar for XML documents that regulates placement of tags, where tags appear, which element names are legal, how attributes are attached to elements, and so forth. This grammar is specific enough to allow development of XML parsers that can read and understand any XML document. Documents that satisfy this grammar are said to be 'well formed.' Documents that are not well-formed are not allowed any more than a C program containing a syntax error would be. XML processors reject documents that contain well-formedness errors. To enhance interoperability, individuals or organizations may agree to use only certain tags. These tag sets are called XML applications. An XML application is not a software application that uses XML, like Mozilla or Microsoft Word. Rather, it is an application of XML to a particular domain, such as vector graphics or cooking.

The markup in an XML document describes the document's structure. It lets you see which elements are associated with which other elements. In a well-designed XML document, the markup also describes the document's semantics. For instance, the markup can indicate that an element is a date, a person, or a bar code. In well-designed XML applications, the markup says nothing about how the document should be displayed. That is, it does not say that an element is bold, italicized, or a list item. XML is a structural and semantic markup language, not a presentation language. A few XML applications, like XSL Formatting Objects, are designed to describe text presentation. However, these are exceptions to the general rule. Although XSL-FO describes presentation, one would not write an XSL-FO document directly. Instead, one would write a more semantically marked-up XML document, then use an XSL Transformations stylesheet to change the semantic-oriented XML into presentation-oriented XML.

The markup permitted in a particular XML application can be documented in a document type definition (DTD). XSD, for example, is a prominent XML schema language. The DTD lists all legal markup and specifies where and how the markup may be included in a document. Particular document instances can be compared to the DTD. Documents that match the DTD are said to be 'valid.' Documents that do not match are invalid. Validity depends on the DTD; whether a document is valid or invalid depends on to which DTD you compare the document.

Not all documents need to be valid. For many purposes, a well-formed document is enough. DTDs are optional in XML. On the other hand, DTDs may not always be sufficient. The DTD syntax is limited and does not allow you to make many useful statements such as, "This element contains a number" or "This string of text is a date between 1974 and 2032." If one was writing programs to read XML documents, one may want to add code to verify statements like these, just as if one were writing code to read a tab-delimited text file. The difference is that XML parsers present the data in a much more convenient format and do more of the work before the application of custom code to the data.

To emphasize for more clarity, XML is a markup language, and only a markup language. First of all, XML is not a programming language. There is no such thing as an XML compiler that reads XML files and produces executable code. One might define a scripting language that uses a native XML format and is interpreted by a binary program, but even this application would be unusual. XML can be used as an instruction format for programs that make things happen. A traditional program, for example, may read a text configuration (config) file and take different actions, depending on what it sees in the file. There's no reason why a configuration file can't be written in XML instead of unstructured text. Indeed, some recent programs are beginning to use XML configuration files. But in all cases the program, not the XML document, takes action. An XML document simply is. It does not do anything on its own.

Furthermore, XML is not a network-transport protocol. XML, like HTML, won't send data across the network. However, data sent across the network using HTTP, FTP, NFS, or some other protocol might be in an XML format. XML can be the format for data sent across the network, but again, software outside the XML document does the actual sending.

Finally, XML is not a database. XML does not replace an Oracle or MySQL server. A database can contain XML data as a VARCHAR, a BLOB, or a custom XML datatype; but the database itself is not an XML document. You can store XML data in a database or on a server or retrieve data from a database in an XML format, but to do so, software written in a real programming language like C or Java is utilized. To store XML in a database, software on the client side sends the XML data to the server using an established network protocol like TCP/IP. Software on the server side receives the XML data, parses it, and stores it in the database. To retrieve an XML document from a database, one generally passes through a middleware product like Enhydra that makes SQL queries against the database and formats the result set as XML before returning it to the client. Indeed, some databases may integrate this software code into their core server or provide plug-ins, such as the Oracle XSQL servlet, to do it. XML serves very well as a ubiquitous, platform-independent transport format in these scenarios. However, XML is not the database.

One of the key advantages of XML is that it offers the tantalizing possibility of truly cross-platform, long-term data formats. It has long been the case that a document written by one piece of software on one platform is not necessarily readable on a different platform, by a different program on the same platform, or even by a future or past version of the same software on the same platform. When the document can be read, all the information may not necessarily come across. For example, much of the data from the original moon landings in the late 1960s and early 1970s is now effectively lost. Even if a tape drive were found that read the obsolete tapes, nobody understands the format in which the data is stored.

XML is thus an incredibly simple, well-documented, straightforward data format. XML documents are text, and any tool that can read a text file can read an XML document. Both XML data and markup are text, and the markup is present in the XML file as tags. There is thus no confusion generated over whether every eighth byte is random padding, whether a four-byte quantity is a two's complement integer or an IEEE 754 floating point number, or which integer codes map to which formatting properties. Tag names can be read directly to see exactly what's in the document. Similarly, since tags define element boundaries, unexpected line ending conventions or the number of spaces mapped to a tab do not generate confusion. With XML, the important details about the document's structure are made explicit, obviating the need to ever reverse engineer the format or rely on questionable, and often unavailable, documentation.

XML allows documents and data to move from one system to another with a reasonable hope that the receiving system can make sense out of it. Furthermore, validation lets the receiving side ensure that it gets what it expects. XML delivers portable data.

Development of extensions to the core XML specification continues. Future directions, for example, include: Xfragment, XML Schemas, XHTML, XML Query Language, Canonical XML, XML Signatures and other developments. Xfragment is an effort to make sense out of XML document pieces that may not be considered well-formed documents in isolation. XML Schemas is an XML application that can describe the allowed content of documents conforming to a particular XML vocabulary. XHTML is a reformulation of HTML as a well-formed, modular, potentially valid XML application. XML Query Language is a language for finding the elements in a document that meet specified criteria. Canonical XML is a standard algorithm used for determining whether two XML documents are the same after throwing away insignificant details, such as whether single or double quotes are used around attribute values. XML Signatures refers to a standard means of digitally signing XML documents, embedding signatures in XML documents, and authenticating the resulting documents. Many new extensions of XML remain to be invented, especially as XML proves itself a solid foundation for many other technologies.

How XML Works

Example 1-1 below shows a simple XML document. This particular XML document might appear in an inventory control system or a stock database. It marks up the data with tags and attributes describing the color, size, bar code number, manufacturer, and product name.

Example 1-1

An XML Document

```
<?xml version="1.0"?>
<product barcode="2394287410">
    <manufacturer>Verbatim</manufacturer>
    <name>DataLife MF 2HD</name>
    <quantity>10</quantity>
    <size>3.5"</size>
    <color>black</color>
        <description>floppy disks</description>
    </product>
```

This document is text and might well be stored in a text file. The document can be edited with this file with any standard text editor, such as BBEdit, UltraEdit, Emacs, or vi. A special XML editor is unnecessary. Then again, this document might not be a file at all. It might be a record in a database. It might be assembled on the fly by a CGI query to a web server and exist only in a computer's memory. It might even be stored in multiple files and assembled at runtime. Even if it isn't in a file, however, the document is a text document that can be read and transmitted by any software capable of reading and transmitting text.

Programs that try to understand the contents of the XML document i.e., programs that do not merely treat it as any other text file, use an XML parser to read the document. The parser is responsible for dividing the document into individual elements, attributes, and other pieces. The parser passes the contents of the XML document to the application piece by piece. If at any point the parser detects a violation of XML rules, it reports the error to the application and stops parsing. In some cases, the parser may read past the original error in the document so it can detect and report other errors that occur later in the document. However, once the parser has detected the first error, it no longer passes along the contents of the elements and attributes it encounters to the application.

Individual XML applications normally dictate precise rules about which elements and attributes are allowed where. You wouldn't expect to find a G_Clef element when reading a biology document, for instance. Some of these rules can be specified precisely using a DTD. A document may contain either the DTD itself or a pointer to a URL where the DTD may be found. Some XML parsers notice these details and compare the document to its corresponding DTD as they read the document to see if the document satisfies the specified constraints. Such a parser is called a validating parser. A violation of those constraints is a validity error, and the whole process of checking a document against a DTD is called validation. If a validating parser finds a validity error, it reports it to the application on whose behalf it parses the document. This application can then decide whether it wishes to continue parsing the document. However, validity errors, unlike well-formedness errors, are not necessarily fatal; an application may choose to ignore them. Not all parsers are validating parsers. Some merely check for well-formedness.

The application that receives data from the parser may be: (1) a web browser that displays the document to a reader, (2) a word processor that loads the XML document for editing, (3) a database server that stores XML data in a database, (4), a drawing program that interprets XML as two-dimensional coordinates for the contents of a picture, (5) a spreadsheet that parses XML to find numbers and functions used in a calculation, (6) a personal finance program that sees XML as a bank statement, (7) a syndication program that reads the XML document and extracts the headlines for today's news, (8) a program written in Java, C, Python, or some other language that does exactly what you want it to do and/or (9) almost anything else.

XML is thus an extremely flexible format for data. It can be used in all of these scenarios and many more. In theory, any data that can be stored in a computer can be stored in XML format. In practice, XML is suitable for storing and exchanging any data that can be plausibly encoded as text. Its use is generally unsuitable for multimedia data, such as photographs, recorded sound, video, and other very large bit sequences.

XML Binary Formatting

Figure 2:
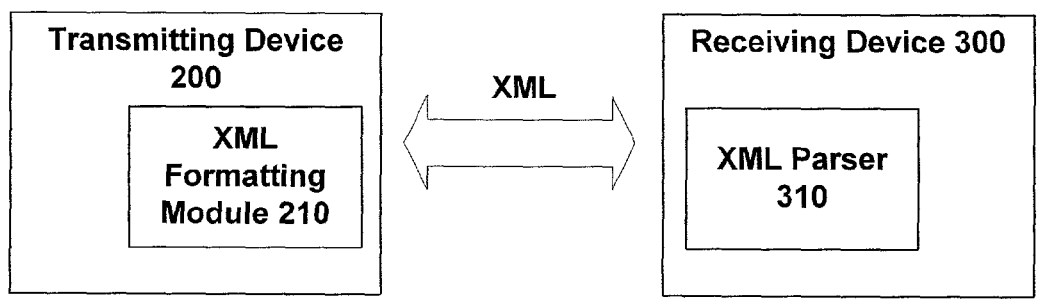
FIG. 2 is an exemplary block diagram illustrating exemplary communications for an XML document formatted according to W3C specifications between transmitting and receiving devices.

FIG. 2 is a simplified view of the transmission of a well formed XML document from a transmitting computing device 200 to a receiving computing device 300. Regardless of the point in time at which it was created, and irrespective of where the formatting code 210 performed the formatting, XML document 250 was generated in accordance with W3C standards. XML document is then transmitted to receiving device 300 via any protocol, such as HTTP, FTP, etc. Then, at the receiving computing device 300, a piece of code 310, the parser, parses the XML formatted document for an application, such as a Web browser, although it may be parsed for use by any application, process, device, etc.

Figure 3A:
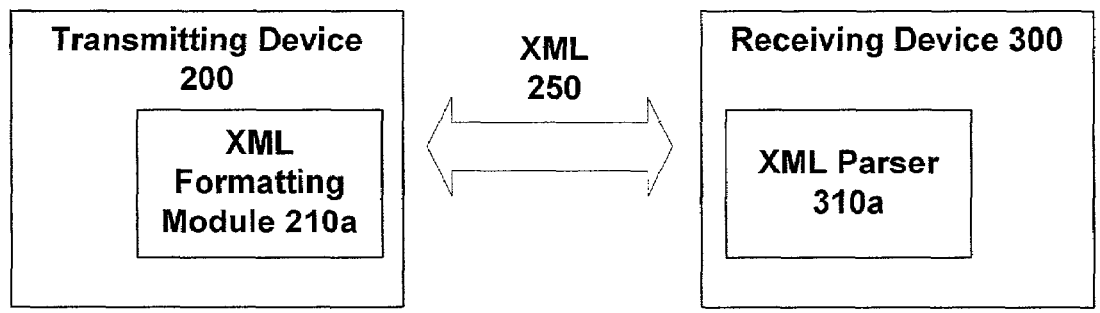
FIGS. 3A and 3B are exemplary block diagrams illustrating exemplary communications between transmitting and receiving devices of an XML binary formatted document according to the present invention.
Figure 3B:
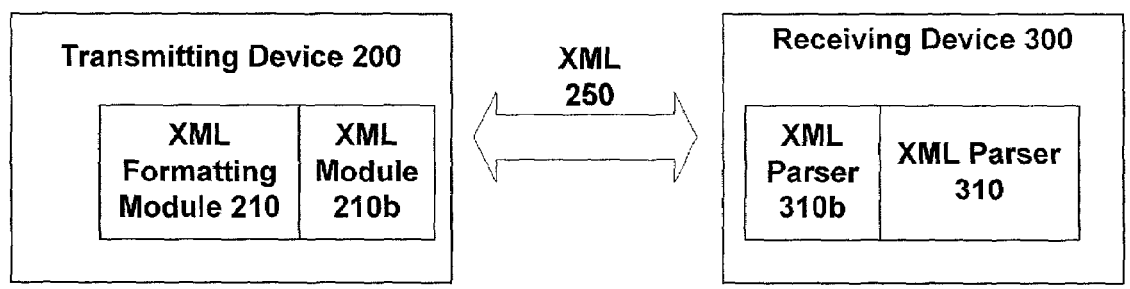

As shown in FIGS. 3A and 3B, the XML binary format of the present invention minimizes the parsing and generation of overhead in connection with XML documents. Means for taking an arbitrary well-formed XML document in a text format, means for converting it to a binary format, and means for converting the document back to the text format without a loss of fidelity are provided, although one or more means may not be needed. In FIG. 3A, the XML formatting module 210 has been modified to be XML formatting module or tokenizer 210a in order to perform a pre-parsing binary formatting step in accordance with the present invention. Additionally, XML parser 310 may be modified to be XML parser 310a to directly parse the below-defined binary format. Alternatively, as shown in FIG. 3B, additional components may be utilized in connection with XML parser 310 and XML formatting module 210 to achieve the same result. For example, XML module 210b may be utilized as a means for converting the XML document from a text format to the binary format of the present invention. Similarly, XML parser 310b may be utilized as a means for parsing and converting to text the binary formatted XML document at the receiving device 300, before passing the document 250 to a standard text parser 310. The format of the present invention is also generally designed to reduce the size of an XML document 250, assuming that the text is left in the same character encoding. This is achieved by tokenizing the XML tag names and attribute names into variable sized numeric tokens, as described in more detail below. FIGS. 3A and 3B may be permuted as well i.e., a receiving device 300 may have native binary capabilities and the transmitting device 200 may not, or vice versa.

Thus, in order to reduce XML text generation overhead when the original data is binary, the format of the present invention allows primitive types to be present in the stream in their 'native' binary representation. In order to simplify generating composite XML documents from existing data and fragments, the present invention also allows XML text embedded in the document. When such XML text is embedded in the document, the character encoding matches the encoding of the main document.

Streaming access is also important both at parsing and generation time, and so the binary format, generated or parsed by modules 210a, 210b, 310a or 310b, is designed to allow incremental output and parsing of the XML document without forcing the creation of a global token table or string table at the beginning of the stream.

Figure 4A:
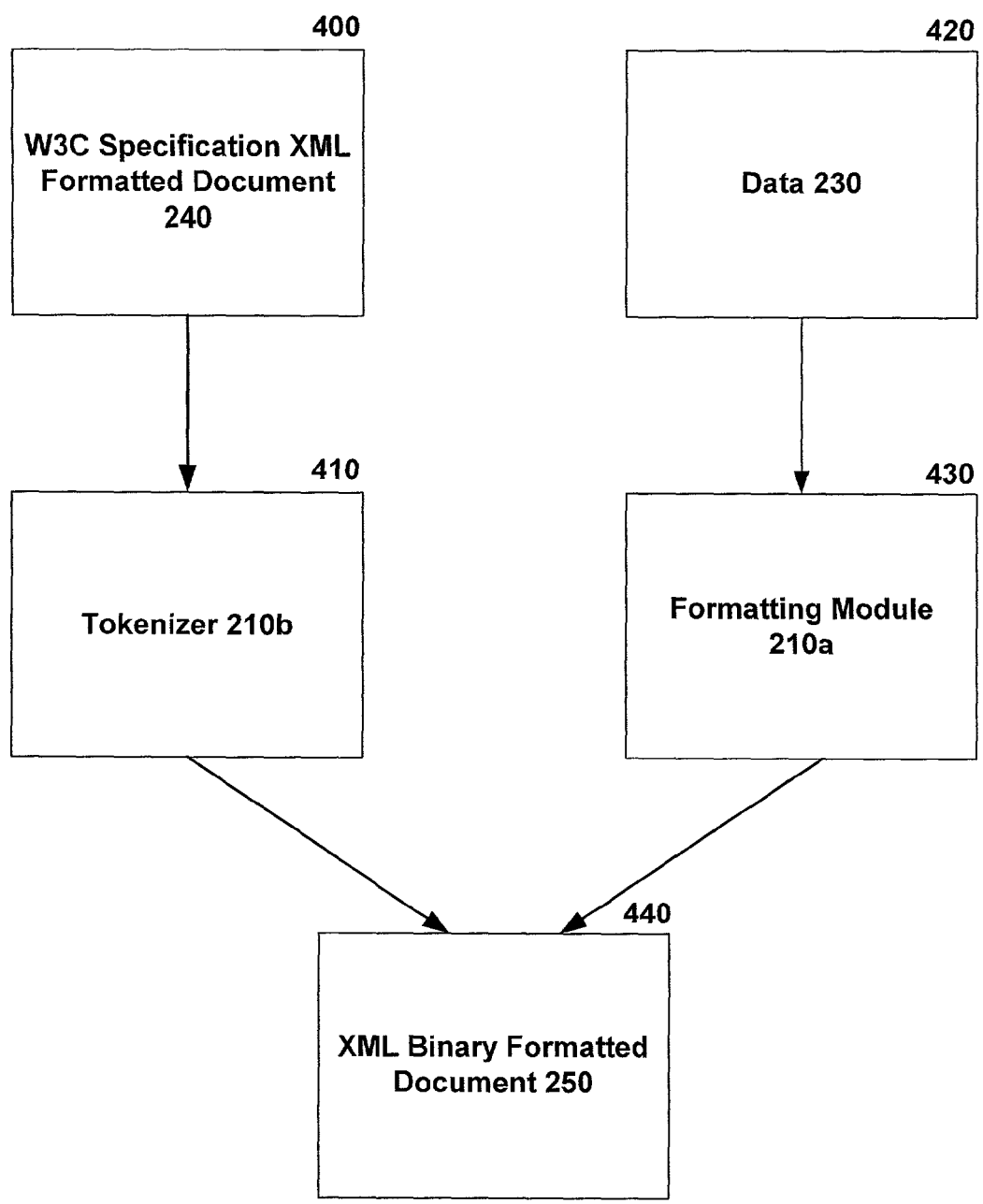

FIG. 4A illustrates exemplary operational flow of the formatting of data according to the binary format of the present invention. Parallel paths are implicated depending upon whether FIG. 3A or 3B are involved. In the FIG. 3B case, at 400, the XML document 240 is already formatted according to the standard W3C specification by XML formatting module 210. Then, at 410, tokenizer 210b of the present invention, tokenizes the document 240 producing XML binary formatted document 250 at 440. In the FIG. 3A case, at 420, data 230, from wherever assembled, is formatted directly with a formatting module 210a at 430 in accordance with tokenization of the present invention, thereby producing XML binary formatted document 250 at 440.

Similarly, FIG. 4B illustrates exemplary operational flow of parsing an XML binary document 250 in accordance with the present invention for an application, program, process, etc. In either case, an XML binary formatted document 250 is received at 450. In the FIG. 3A case, at 460, an XML parser 310a in accordance with the present invention directly parses the document 250, and provides the parsed XML data to the appropriate application, program, etc. 260 at 490. In the FIG. 3B case, at 470, parser component 310b parses the document 250 for a standard parser 310 to parse at 480. Then, the parsed XML data can be forwarded to the appropriate application, program etc. 260 at 490.

In the following description of the binary format of the present invention, terms and definitions from the W3C Extensible Markup Language (XML) 1.0 recommendation are utilized, a copy of which may be freely obtained. The structure of a binary XML document in accordance with the invention is like the structure of an XML text document. The XML markup structures (elements, comments, processing instructions, etc.) are represented by byte tokens. All XML 'Name' constructs are tokenized and replaced by name tokens. Tokens are fixed sized 8 bit unsigned integers.

Byte

Byte ::= 8 bit unsigned integer

Token

Token ::= byte

Table 1-1 lists a set of tokens. Each token defines what follows. The most significant bit has special meaning depending on the type of the token. In general, token names as used in production rules appear in uppercased bold letters.

TABLE 1-1

| TOKEN NAME | VALUE | DESCRIPTION | HIGH BIT |
|---|---|---|---|
| END | 0 | End of attribute list or element content | |
| ELEMENT | 1 | Element | Empty element |
| ATTRIBUTE | 2 | Attribute | |
| PI | 3 | Processing instruction | |
| COMMENT | 4 | Comment | |
| CDATA | 5 | CDATA section | |
| ENITITYREF | 6 | Entity reference | Singleton |
| CHARREF | 7 | Character entity reference | Singleton |
| NAME | 8 | Name definition | |
| TEXTDATA | 9 | Character data | Singleton |
| XMLDATA | 10 | XML character data | |
| EXTENSION | 11 | XML structure intended for processor only | |
| BINARY | 12 | Binary data | Singleton |
| INT | 13 | Signed integer value | Singleton |
| UINT | 14 | Unsigned integer value | Singleton |
| DECIMAL | 15 | Decimal value | Singleton |
| MONEY | 16 | Currency value | Singleton |
| SMALLMONEY | 17 | Small range currency value | Singleton |
| FLOAT | 18 | 4 byte floating precision value | Singleton |
| REAL | 19 | 8 byte floating precision value | Singleton |
| DATETIME | 20 | 8 byte date and time structure | Singleton |
| SMALLDATETIME | 21 | 4 byte date and time structure | Singleton |
| GUID | 22 | 16 byte UUID | Singleton |
| XMLDECL | 23 | XML PI | |
| DOCTYPEDECL | 24 | Document type declaration | |

TABLE 1-1-continued

Variable sized unsigned integer values are represented by a multi-byte encoding format. This consists of a series of bytes where the most significant bit is a continuation flag. This allows 7 bit values per byte. The original value is encoded starting with the most significant 7 bits and continued big-endian order.

MultiByte mb32 ::= byte+   /* 32 bit unsigned integer in multi-byte encoding */

Text data is represented as the number of characters encoded in a multi-byte value followed by the specified number of characters (e.g., by using the 'Char' construct from the XML specification). White space can be preserved in the document by encoding it as TEXTDATA token followed by the textdata construct.

TextData

Textdata ::= mb32 Char*

Named XML constructs (elements, PI-s, etc.) are encoded with the type token followed by a name token. The name token is an index into the name table. The name table is created by NAME tokens embedded in the XML stream.

NameDef

Namedef ::= NAME TextData

The NameDef construct provides a way to define a new NameToken and associate the NameToken with the TextData that contains the name following it. The NameDef construct creates a new entry in the name table and associates a unique unsigned integer id to it, which in one implementation, is the number of names in the table i.e., the numbers are generated by using the ordinal number of the next available slot in a name table which contains all the entries from NameDef constructs that have been used thus far. These NameToken numbers may be encoded in the multi-byte encoding format e.g., mb32 values.

The 'namedef' construct is allowed everywhere where a type token is allowed, so it is possible to define all the names at the beginning of the stream. When a tokenizer, such as formatting module 210b, operates on a 'normal' or text-based XML stream, the tokenizer embeds these as it encounters new names.

NameToken

Nametoken ::= mb32

The following primitive binary data types are allowed in element content and attribute values in addition to character data:

| Binary Value | |
|---|---|
| Value ::= | int \| /* 1, 2, 4, 8 byte signed integer */ |
| | uint \| /* 1, 2, 4, 8 byte unsigned integer */ |
| | decimal \| /* 5, 9, 13, 17 decimal type */ |
| | money \| /* 8 byte currency */ |
| | smallmoney \| /* 4 byte currency */ |
| | float \| /* 4 byte floating precision number */ |
| | real \| /* 8 byte floating precision number */ |
| | datetime \| /* 8 byte structure */ |
| | smalldatetime \| /* 4 byte structure */ |
| | guid /* 16 byte binary */ |

Arbitrary length binary data is encoded as the number of bytes encoded in a multi-byte value followed by the specified number of bytes.

| BinaryData |
|---|
| Bindata ::= mb32 byte* |

There are also some XML constructs in the W3C recommendation that may be modified for accommodation with the binary format. The document construct stays the same.

| Document |
|---|
| Document ::= prolog element Misc* |

The 'element' construct is as follows:

| Element |
|---|
| Element ::= EmptyElemTag |
| \| STag content ETag |

Elements with content are encoded by the ELEMENT token followed by optional attribute list and content closed by the END token.

| Start-tag |
|---|
| Stag ::= ELEMENT nametoken(Attribute)* |
| Attribute ::= ATTRIBUTE nametoken AttValue |
| Etag ::= END |

In order to optimize singleton value elements, where there is only one construct is in the content, if the most significant bit is set on the content type token it indicates that there is no need for an END token.

| Content of Elements |
|---|
| Content ::= (element \| Data \| Reference \| CDSect \| PI \| Comment)* |

The element content can include typed data in addition to the original XML constructs so the original CharData is replaced by Data in the production.

| Data | |
|---|---|
| Data ::= | (TEXTDATA textdata) \| |
| | (XMLDATA textdata) \| |
| | (BINARY bindata) \| |
| | (EXTENSION element) \| |
| | (INT int) \| |
| | (UINT uint) \| |
| | (DECIMAL decimal) \| |
| | (MONEY money) \| |
| | (SMALLMONEY smallmoney) \| |
| | (FLOAT float) \| |
| | (REAL real) \| |
| | (DATETIME datetime) \| |
| | (SMALLDATETIME smalldatetime) \| |
| | (GUID guid) |

Empty elements are encoded by the ELEMENT token with the most significant bit set followed by the name token and optional attributes.

| Empty Element |
|---|
| EmptyElemTag ::= ELEMENT+0x80 nametoken (Attribute)* |

References are encoded as integer value for character references and as a name token for named references.

| Entity Reference |
|---|
| Reference ::= EntityRef \| CharRef |
| EntityRef ::= ENTITYREF nametoken |
| CharRef ::= CHARREF mb32 |

Processing instructions are encoded as name token for the target and text value for the characters in the PI body.

| Processing Instructions |
|---|
| PI ::= PI nametoken textdata |

Comments and CDATA sections are encoded as simple textdata following the token.

| Comments |
|---|
| Comment ::= COMMENT nametoken textdata |
| CDATA Sections |
| CDSect ::= CDATA textdata |

With respect to prolog and misc sections in a produced document, the XMLDecl production includes the version information as two bytes for the associated major and minor versions. The version information is followed by the encoding number according to the IANA (Internet Assigned Numbers Authority) assigned Management Information Base (MIB) number for the character set in multi-byte encoding. The last part is a byte indicating the standalone boolean value.

| Prolog |
| --- |
| Prolog ::= XMLDecl? Misc* (doctypedecl Misc*)?<br>XMLDecl ::= XMLDECL VersionInfo EncodingDecl SDDecl<br>VersionInfo ::= Byte byte<br>EncodingDecl ::= mb32<br>SDDecl ::= Byte<br>Misc ::= comment | PI | S |

The doctypedecl part of the XML stream is left in XML text format.

| Document Type Definition |
| --- |
| [28] doctypedecl ::= DOCTYPEDECL textdata |

The use of the XMLDATA token allows mixing in arbitrary XML text, which would be parsed by an XML parser. This is not true the other way around i.e., the text cannot include a binary stream inside.

Extensions of XML Binary Format

It would be useful to allow tokenized data in content both in attribute value and element content. Thus, a new token type that refers to name tokens can be added to the 'Data' production which, for example, would help a lot in documents with heavy use of ID/IDREFS.

In addition, a content text table can be introduced with added tokenized values, similar to name tokens, and another token can be added to the 'Data' production to refer to this table. Documents using lots of repeated attribute values are a good target for this implementation.

EXAMPLES

In Examples A and B below, a text-based representation precedes a binary formatted or tokenized representation in accordance with the present invention. White space is ignored to make the encoding less verbose, and the character count does not include the white space. In example A, the binary representation reduces the overall byte count from 41 to 34. In Example B, the binary representation reduces the overall byte count from 293 to 212.

Example A

```
<a>
    <b>foo</b>
    <bar/>
</a>
<a>
    <b>text</b>
</a>
```

| STREAM | DESCRIPTION |
| --- | --- |
| 0x08 | Name definition for 'a' gets name token 1 |
| 0x01 'a' | Textdata |
| 0x01 | Element |
| 0x01 | Name token 1 for 'a' |
| 0x08 | Name definition for 'b' gets name token 2 |
| 0x01 'b' | Textdata |
| 0x01 | Element |
| 0x02 | Name token 2 for 'b' |
| 0x89 | Text data token with singular bit set (END of 'b') |
| 0x03 'f' 'o' 'o' | Textdata |
| 0x08 | Name definition for 'bar' gets name token 3 |
| 0x03 'b' 'a' 'r' | Textdata |
| 0x81 | Element with empty bit set |
| 0x03 | Name token 1 for 'bar' |
| 0x00 | END of 'bar' (no attributes) |
| 0x00 | END of 'a' |
| 0x01 | Element |
| 0x01 | Name token 1 for 'a' |
| 0x01 | Element |
| 0x02 | Name token 1 for 'b' |
| 0x89 | Text data token with singular bit set (END of 'b') |
| 0x04 't' 'e' 'x' 't' | Textdata |
| 0x00 | END of 'a' |

Example B

```
<?xml version="1.0"?>
<a:books xmlns:a="mybookschema" xmlns:dt="urn:sche-
    mas-microsoft-com:datatypes">
    <a:book>
        <a:title>XML in action</a:title>
        <a:price dt:dt="fixed.14.4">34.2</a:price>
    </a:book>
    <a:book>
        <a:title>Data mining</a:title>
        <a:price dt:dt="fixed.14.4">50</a:price>
    </a:book>
</a:books>
```

| STREAM | DESCRIPTION |
| --- | --- |
| 0x17 0x01 0x00 0x6a 0x01 | Xmldecl, 1.0, utf-8, standalone |
| 0x08 0x07 'a:books' | Name definition for 'a:books' => 1 |
| 0x01 0x01 | Element 'a:books' |
| 0x08 0x07 'xmlns:a' | Name token 1 for 'xmlns:a' => 2 |
| 0x02 0x02 | Attribute 'xmlns:a' |
| 0x89 0x0c 'mybookschema' | Text data with singular bit set |
| 0x08 0x08 'xmlns:dt' | Name token 1 for 'xmlns:a' => 3 |
| 0x02 0x03 | Attribute 'xmlns:dt' |
| 0x89 0x23 'urn:schemas-microsoft-com:datatypes' | Text data with singular bit set |
| 0x08 0x06 'a:book' | Name definition for 'a:book' => 4 |
| 0x08 0x04 | Element 'a:book' |
| 0x08 0x07 'a:title' | Name definition for 'a:title' => 5 |
| 0x08 0x05 | Element 'a:title' |
| 0x89 0x0d 'XML in action' | Text data with singular bit set |
| 0x08 0x07 'a:price' | Name definition for 'a:price' => 6 |
| 0x08 0x06 | Element 'a:price' |
| 0x08 0x05 'dt:dt' | Name definition for 'dt:dt' => 7 |
| 0x02 0x07 | Attribute 'dt:dt' |
| 0x89 0x0a 'fixed.14.4' | Text data with singular bit set |
| 0x90 [34.2] | 8 byte currency data with singular bit set |
| 0x00 | END of 'a:book' |
| 0x08 0x04 | Element 'a:book' |
| 0x08 0x05 | Element 'a:title' |
| 0x89 0x0b 'Data mining' | Text data with singular bit set |
| 0x08 0x06 | Element 'a:price' |
| 0x02 0x07 | Attribute 'dt:dt' |
| 0x89 0x0a 'fixed.14.4' | Text data with singular bit set |
| 0x90 [50] | 8 byte currency data with singular bit set |

-continued

| STREAM | DESCRIPTION |
|---|---|
| 0x00 | END of 'a:book' |
| 0x00 | END of 'a:books' |

Binary XML Specification v. WAP

The Wireless Application Protocol (WAP) Forum™ developed the de-facto world standard for wireless information and telephony services on digital mobile phones and other wireless terminals and has published an open, global wireless protocol specification based on existing Internet standards, such as XML and IP, for all wireless networks.

WAP empowers mobile users of wireless devices to easily access live interactive information services and applications from the screens of mobile phones. Services and applications include email, customer care, call management, unified messaging, weather and traffic alerts, news, sports and information services, electronic commerce transactions and banking services, online address book and directory services, as well as corporate intranet applications.

WAP utilizes HTTP 1.1 Web servers to provide content on the Internet or intranets, thereby leveraging existing application development methodologies and developer skill sets such as CGI, ASP, NSAPI, JAVA and Servlets. WAP defines an XML syntax called WML (Wireless Markup Language). All WML content is accessed over the Internet using standard HTTP 1.1 requests.

To leverage today's extremely large market penetration of mobile devices, WML's user interface components map well onto existing mobile phone user interfaces. This means end-users can immediately use WAP-enabled mobile phones and services without re-education. WAP specifications enable products that employ standard Internet technology to optimize content and airlink protocols to better suit the characteristics and limitations of existing and future wireless networks and devices.

The present invention may be distinguished from WAP. With respect to WAP, first, the XML document encoding is not as complete as its W3C counterpart i.e., DTD, comments and named entity references are lost. Second, a string table is included at the beginning at the stream, which doesn't allow incremental addition to the table. Third, there is no primitive data type encoding although it is possible to provide application specific binary data with the extension tags. Fourth, the element/attribute token space is limited i.e., WAP allows 60 tokens per code page. This quickly makes it necessary to switch code pages around and so a 3 bytes per tag start may be utilized. Lastly, WAP does not allow XML text to mix in.

The main difference between a WML implementation and an XML binary implementation is the token space. With WAP, the tokens include the name tokens as well. This limits the name token range, but it can be switched. With the binary specification of the present invention, tokens can be represented by as many as 7 bits representing up 127 values (1 bit is reserved for empty tag/singular content tag) and name tokens can be represented by up to 32 bits, although the invention is not restricted to these bit numbers.

In order to allow an arbitrary extension construct (which can still be parsed by another parser), in accordance with the present invention, a special EXTENSION token may be added, which is followed by an 'element' production so a whole XML sub-tree can be used to describe a processor specific structure. This is more flexible than the WAP solution with the three extension tokens allowing only byte, integer and text extension.

Tokenized XML Design and Implementation for SQL Server Applications

The following describes a tokenized binary XML format used by SQL Server 8.0 (code-named Shiloh) and consumed by the SQL Server 2000 OLE DB ISequentialStream provider.

The main objective of this implementation of binary tokenized XML is to remove load from a SQL Server 1) by offloading text processing and data conversion from the server engine to the ole db provider and 2) by reducing the size of XML data transferred between the server and ole db.

In the case of SQL servers, establishing a binary XML standard takes a backseat to performance improvements. For example, tokenized XML clients hardly maintain any state, such as a state recording the names of tags opened. Consequently, the time it takes to generate and consume tokenized XML is reduced; nonetheless redundancy is introduced thereby e.g., by expecting tags to be re-specified upon closing.

Tokenized XML is a stream of bytes representing a sequence of zero or more XML tokens where an XML token is a sequence of one or more bytes, the first of which designates the token type.

In the SQL server implementation of the present invention, the following constants listed in Table 2-1 designate the XML token types generated by the SQL Server and consumed by the SQL Server 2000 OLE DB provider.

TABLE 2-1

| #define XMLTOK_BEGINTAG | 0x01 |
| #define XMLTOK_ATTRIB | 0x02 |
| #define XMLTOK_PCDATA | 0x03 |
| #define XMLTOK_BEGINTAGENDS | 0x41 |
| #define XMLTOK_ATTRIBMVENDS | 0x42 |
| #define XMLTOK_ENDUNARYTAG | 0x43 |
| #define XMLTOK_DECLARETAG | 0x44 |
| #define XMLTOK_ENDTAG | 0x81 |
| #define XMLTOK_VERSION | 0xFE |
| #define XMLTOK END | 0xFF |

Begin tag tokens are for the purpose of opening an XML tag '<TAG' and are formatted according to the following:

Begin Tag:=XMLTOK BEGINTAG, TagID

The purpose of the following TagID syntax is to dereference a TagID constructed by the little-endian representation of the lower 7-bit byte representation of a sequence of bytes with the high-bit functioning as an overflow indicator. The resulting unsigned integer—if nonzero—dereferences a tag ordinal assigned incrementally starting with 1 by XMLTOK-DECLARETAG. If the TagID is zero, the construct is an "inline tag declaration" and expected to be followed by a unicode tag name.

| TagID := | UINT, TagID \| | |
| | UINT, TagNameDeclaration | /* UINT equals 0 */ |

With respect to unsigned integers, the following syntax is utilized:

```
UINT :=         BYTE |              /* BYTE in 0-127 range */
                BYTE, UINT          /* BYTE in 128-255 range */
TagNameDeclaration := UINT, WCHAR*  /* UINT is tagname length
                                       followed by the number
                                       of unicode characters */
```

For attribute tokens, the following syntax is applicable in accordance with the SQL implementation:
Attribute:=XMLTOK_ATTRIB, TagID |Value The purpose of this syntax is to generate that 'ATTRIB="VALUE"'. The Value essentially holds SQL Server datatype ordinals, including the following:

```
DataType :=

ORD_I2 |            // = 1, signed 2 byte int
ORD_I4 |            // = 2, signed 4 byte int
ORD_R4 |            // = 3, float
ORD_R8 |            // = 4, double
ORD_MONEY |         // = 5, currency: 8 byte signed int,
                       scaled by 10^4
ORD_BOOL |          // = 6, pseudonym for BIT
ORD_UI1 |           // = 7, signed 1 byte int
ORD_I8 |            // = 8, signed 8 byte int
ORD_SSGUID |        // = 9, GUID
ORD_SSDECIMAL |     // = 10, Decimal (0-38 precision)
ORD_SSNUMERIC       // = 11, Numeric (0-38 precision)
ORD_SSBYTES |       // = 12, binary string of constant length
ORD_SSSTR |         // = 13, ascii string of constant length
ORD_SSWSTR |        // = 14, unicode string of constant length
ORD_VARBYTES |      // = 15, binary string of variable length
ORD_VARSTR |        // = 16, ascii string of variable length
ORD_VARWSTR |       // = 17, unicode string of variable length
ORD_SSDATE |        // = 18, DATE
ORD_SMALLDATE |     // = 19, DATE4
ORD_SMALLMONEY |    // = 20, MONY4
ORD_TIMESTAMP |     // = 21, Timestamp (binary(8)/DBTS)
ORD_CLOB |          // = 22, Ascii LOB
ORD_BLOB |          // = 23, Binary LOB
ORD_WLOB            // = 24, Unicode LOB
```

Orthogonally to these types, type modifiers are OR-ed into the 3 high-bits of the typebyte. These include:

```
#define XMLDATATYPEFLAG__MULTIVALUED    0x20
#define XMLDATATYPEFLAG__DONTENTITIZE   0x40
#define XMLDATATYPEFLAG__CDATA          0x80
```

The value of the attribute token may be described as follows:

```
Value :=

BYTE |                                          // 6, 7 BIT signed 1 byte int
BYTE, BYTE |                                    // 1 signed 2 byte int
BYTE, BYTE, BYTE, BYTE |                        // 2, 3, 19, 20 signed 4 byte int, float, small date, small
                                                   money
BYTE, BYTE, BYTE, BYTE, BYTE, BYTE, BYTE, BYTE |
                                                // 4, 5, 8, 18 double, currency, signed 8 byte int, date
MAXLEN, 16BYTES |                               // 9 CSsGuid
PRECISION, SCALE, MAXLEN, 17BYTES |             // 10, 11 decimal, numeric
LENGTH2, BYTE* |                                // 12, 13, 14, 15 16, 17 fixed len binary, var len binary,
                                                   fixed
                                                //len str, var len str, fixed len unicode str, var len unicode str
LENGTH2, BYTE, BYTE |                           // 21 Timestamp (binary(8)/DBTS)
LENGTH4, BYTE, BYTE, BYTE, BYTE |               //22,23,24
  BLOB, CLOB, WLOB
``` where MAXLEN, PRECISION, SCALE map to BYTE, and LENGTH2/LENGTH4 map to two/four BYTEs and express unsigned, little-endian length.

The purpose of the following PCData token is that it gives the ability to generate any straight value 'VALUE':
PCData:=XMLTOK_PCDATA |Value The purpose of the following End Begin Tag token is that it generates '>':
EndBeginTag:=XMLTOK_BEGINTAGENDS The purpose of the following End Multivalue Attribute token is that it closes an attribute started with XMLTOK_ATTRIB and type modifier XMLDATATYPEFLAG-_MULTI-VALUED on the datatype, and generates closing quotes "":
EndMultivalueAttribute:=XMLTOK_ATTRIBMVENDS The purpose of the following End Unary Tag token is that it generates '/>':
EndUnaryTag:=XMLTOK_ENDUNARYTAG The purpose of the following Declare Tag token is that it registers a new tag or attribute name, implicitly assigning a TagID counter beginning with the first TagID=1 initially. No textual XML is generated for this token:
DeclareTag:=XMLTOK_DECLARETAG, TagNameDeclaration The purpose of the following End Tag token is that it represents "</TAG>" (Note how specifying TagID is redundant if the client maintains more state):
EndTag:=XMLTOK_ENDTAG, TagID The purpose of the following Tokenized XML Version token (optional) is that it indicates the version of tokenized XML in case the format needs to be changed in the future. By default, version is set to 1 to match the version of tokenized XML in SQL Server 2000. This token adds ability for clients to use different tokenized XML decoders in special cases:
Version:=XMLTOK_VERSION The purpose of the following End Document token (also optional) is that it indicates the end of the tokenized XML stream, e.g., in case the stream is padded:
EndXMLFragment:=XMLTOK END XML tokens such as XMLTOK_ATTRIB and XMLTOK_PCDATA can be arbitrarily large, since maxlen is approximately 4 Gigabytes. Therefore, an XML consumer should be prepared to consume such tokens incrementally by breaking up a long token into manageable pieces.

This exemplary implementation operates with both an input buffer holding tokenized XML as well as an output buffer for the textual XML and both buffers impose size limitations that are addressed by processing the first 1000 bytes of attribute and pcdata tokens, holding variable-length datatypes, such as strings, and leaving the rest for later processing once the buffers become available again.

With the SQL Server 2000 implementation, as described herein, two additional tokens are reserved for clientside roundtripping: XMLTOK ATTRIB CONTINUED (0x22) and XMLTOK PCDATA CONTINUED (0x23). These are tokens not generated by the tokenized XML generator (SQL Server 2000), but generated intermediately by the SQL Server 2000 OLE DB IsequentialStream provider.

The described methodologies can be implemented using a variety of different technical architectures including both server and client side execution. It may be implemented in code or generated from meta descriptions. The preceding exemplifies merely some of the possible implementation technologies. One of ordinary skill in the art will recognize that while all data is represented as ones and zeroes in a computer system, and thus is 'binary', binary as utilized herein is in contradistinction to ASCII, or text based character representations. It can further be appreciated that while the domain for integer values, as described herein, has been described as including 32 bits, the domain thereof could be implemented as any size. Additionally, while exemplary descriptions of tokens, etc. in accordance with the binary formatted tag-based description language of the present invention have been described as being represented with 4 bits, 7 bits, etc., any number is feasible and it should be emphasized that these are implementation specific details that can be generalized to any number. While the above exemplary computer-executable instructions and processes have been described in the context of XML, these concepts and principles may be applied to any tag-based description language.

The data that XML may be utilized to format as used herein is intended to cover not only video, graphics, text, audio, voicemail and/or any other type of data in any pre-processed, processed or compressed form, but is additionally intended to cover data of any kind communicated along any transmission medium between any source and receiver.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and nonvolatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, and as emphasized above, one skilled in the art will recognize that the present invention is not limited to XML. In such circumstances and according to the present invention, the functions, syntax and the desirability of their use remains applicable. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for generating a data stream according to a binary format of a tag-based description language, comprising:

receiving a plurality of tag names;
receiving a plurality of attribute names;
identifying tag names from said plurality of tag names;
identifying attribute names from said plurality of attribute names;
tokenizing tag names into numeric tokens;
tokenizing attribute names into said numeric tokens;
wherein said data stream comprises of said tokenized tag names and said tokenized attribute names, and wherein said data stream further comprises binary primitive types when such primitive types were originally in binary format;
wherein said numeric tokens are configured to be variable-sized; and
wherein said numeric tokens are configured for incremental output and parsing thereby obviating a global token table at the beginning of said data stream.

2. The method according to claim 1, wherein said tokenizing of tag names includes inserting a name definition construct into the data stream the first time a tag name is encountered for purposes of recreating the tag names by a device that receives the data stream.

3. The method according to claim 1, wherein the tag-based description language is extensible markup language (XML).

4. The method according to claim 1, wherein the tokenizing of the tag and attribute names decreases the time elapsed parsing the data stream by a device that receives the data stream, the time being decreased relative to the parsing of a corresponding text-based format of the tag-based description language.

5. The method according to claim 1, wherein the tokenizing of the tag and attribute names decreases overhead incident to formatting data for representation according to the tag-based description language.

6. The method according to claim 1, wherein the tokenizing of the tag and attribute names decreases the size of the resulting data file formatted according to the tag-based description language.

7. The computer storage medium storing thereon computer executable instructions for carrying out the method of claim 1.

8. A computer storage medium storing thereon computer executable instructions for carrying out the method of receiving a well-formed document in a text format of a tag-based description language and converting the document to a binary format via tokenization of the tag and attribute names into numeric tokens, comprising:
- tokenizing said tag and attribute names into a set of numeric tokens;
- wherein said tokenizing of attribute names enables values natively stored as binary data types to be inserted into a data stream;
- wherein said tokenization of tag names includes inserting a name definition construct into the data stream the first time a tag name is encountered for purposes of recreating the tag names by a device that receives said data stream;
- wherein the numeric tokens are in incrementally consumable form; and
- wherein the numeric tokens are configured for incremental output and parsing thereby obviating a global token table at the beginning of said data stream.

9. The computer readable medium according to claim 8, said receiving includes receiving a document formatted according to a text format of XML.

10. The computer storage medium storing thereon computer executable instructions for carrying out the method of assembling data into a document according to a binary format and then parsing said document back into text format, comprising:
- tokenizing tag and attribute names into variable sized numeric tokens, wherein said numeric tokens are in incrementally consumable form thereby obviating a global token table at the beginning of a data stream;
- including in said tokenizing any binary primitives and name definition constructs;
- configuring said document to be parsed into said text format;
- configuring said document to be consumed in numeric token form incrementally by breaking up at least one long token of said numeric tokens into predetermined and manageable pieces; and
- wherein said numeric tokens are configured to designate token types in their first series of bytes.

11. The computer readable medium according to claim 10, further comprising receiving said document that is formatted according to a text format of XML.

12. A computer storage medium storing thereon computer executable instructions for carrying out the method of receiving a document formatted according to a binary format of a tag-based description language and directly parsing the data in the document for use by another element in a computer system, comprising:
- receiving said document;
- converting said document to a text format of the tag-based description language;
- wherein said document corresponds to a data stream that comprises of tokenized tag names and tokenized attribute names, and wherein said data stream further comprises binary primitive types when such primitive types were originally in binary format;
- wherein said converting comprises changing numeric variable sized tokens into said text format, wherein said tokens are configured for incremental output and parsing resulting in obviating global token tables; and
- storing said converted text format in a memory.

13. The computer readable medium according to claim 12, wherein said receiving includes receiving a document formatted according to a binary format of XML.

14. In a system in which a transmitting device transmits in a streaming fashion data formatted according to a tag-based and attribute-based description language, a method for generating a data stream according to a binary format of said tag-based description language and said attribute-based description language, comprising:
- for each unique tag name, at the first time a tag name of the data is encountered, tokenizing the tag name into a first numeric token and transmitting the first numeric token and the text associated with the tag name;
- wherein said first numeric token for said tag name is variable sized;
- at any time subsequent to the first time that the tag name of the data is encountered, transmitting the first numeric token without the text;
- for each unique attribute name, at the first time an attribute name of the data is encountered, tokenizing the attribute name into a second numeric token and transmitting the second numeric token and the text associated with the attribute name;
- wherein said second numeric token for said attribute name is variable sized;
- at any time subsequent to the first time that the attribute name of the data is encountered, transmitting the second numeric token without the text;
- wherein said tokenizing of attributes enables values natively stored as binary data types to be inserted into the data stream; and
- wherein said first numeric token and said second numeric token are configured for incremental output and parsing thereby obviating any global token tables at the beginning of said data stream.

15. The method according to claim 14, wherein the tag-based description language is extensible markup language (XML).

16. The method according to claim 14, wherein the tokenizing of the tag and attribute names decreases the time elapsed parsing the data stream by a device that receives the data stream, the time being decreased relative to the parsing of a corresponding text-based format of the tag-based description language.

17. The method according to claim 14, wherein the tokenizing of the tag and attribute names decreases overhead incident to formatting data for representation according to the tag-based description language.

18. The method according to claim 14, wherein the tokenizing of the tag and attribute names decreases the size of the resulting data file formatted according to the tag-based description language.

19. The computer storage medium bearing computer executable instructions for carrying out the method of claim 14.

* * * * *